US011549571B2

(12) United States Patent
Kordus

(10) Patent No.: US 11,549,571 B2
(45) Date of Patent: Jan. 10, 2023

(54) BELT TENSIONING APPARATUS FOR MATERIAL REMOVAL MACHINES

(71) Applicant: ILLINOIS TOOL WORKS INC., Glenview, IL (US)

(72) Inventor: Bryan John Kordus, Twin Lakes, WI (US)

(73) Assignee: Illinois Tool Works Inc., Glenview, IL (US)

( * ) Notice: Subject to any disclaimer, the term of this patent is extended or adjusted under 35 U.S.C. 154(b) by 667 days.

(21) Appl. No.: 16/517,183

(22) Filed: Jul. 19, 2019

(65) Prior Publication Data

US 2020/0072324 A1  Mar. 5, 2020

Related U.S. Application Data

(60) Provisional application No. 62/724,145, filed on Aug. 29, 2018.

(51) Int. Cl.
*F16H 7/14* (2006.01)
*B24B 27/06* (2006.01)
(Continued)

(52) U.S. Cl.
CPC ............... *F16H 7/14* (2013.01); *B23D 47/12* (2013.01); *B23Q 5/043* (2013.01); *B24B 21/20* (2013.01);
(Continued)

(58) Field of Classification Search
CPC ......... B24B 47/12; B24B 47/26; B24B 27/06; B24B 21/20; B24B 27/08; B23D 47/12;
(Continued)

(56) References Cited

U.S. PATENT DOCUMENTS 3,735,489 A * 5/1973 Zatorsky, Jr. ....... B27B 17/0016
30/298.4
4,620,367 A * 11/1986 Tubesing ............ B27B 17/0016
474/33
(Continued)

FOREIGN PATENT DOCUMENTS

DE         3841644      6/1990
DE      202011000143    6/2012
(Continued)

OTHER PUBLICATIONS

International Search Report and Written Opinion, issued in connection with International Patent Application No. PCT/US2019/048711, dated Nov. 22, 2019, 10 pages.

*Primary Examiner* — Scott A Smith
(74) *Attorney, Agent, or Firm* — McAndrews, Held & Malloy, Ltd.

(57) ABSTRACT

Apparatus, systems, and/or methods for adjusting belt tension in a material removal machine are disclosed. In some examples, the material removal machine includes a material removal tool secured on a spindle. A spindle pulley may be secured to the spindle, such that rotation of the spindle pulley causes the material removal tool to be rotated via the spindle. The material removal machine may further include a movable hub that retains the spindle, such that movement of the hub translated into movement of the spindle. Because the spindle pulley is securely attached to the spindle, movement of the hub may translate into movement of the spindle pulley. This movement of the spindle pulley may change a distance between the spindle pulley and an actuator pulley, thereby changing the tension in a belt connecting the spindle pulley and the actuator pulley.

20 Claims, 10 Drawing Sheets

(51) Int. Cl.
  *B24B 47/12* (2006.01)
  *B23Q 5/04* (2006.01)
  *B23D 47/12* (2006.01)
  *B24B 21/20* (2006.01)
  *B27B 5/30* (2006.01)
  *F16H 7/24* (2006.01)
  *B23D 45/16* (2006.01)

(52) U.S. Cl.
  CPC .............. *B24B 27/06* (2013.01); *B24B 47/12* (2013.01); *B23D 45/16* (2013.01); *B27B 5/30* (2013.01); *F16H 7/24* (2013.01)

(58) Field of Classification Search
  CPC ...... B23D 45/16; B23D 45/003; B23D 47/02; B23Q 5/043; B23Q 5/06; F16H 7/14; F16H 7/24; B27B 5/30
  USPC .............. 474/114, 117; 173/1, 29, 213, 217; 30/291; 451/311, 359
  See application file for complete search history.

(56) References Cited

U.S. PATENT DOCUMENTS

| | | | | |
|---|---|---|---|---|
| 4,977,708 A * | 12/1990 | Kloft | ................ | F16H 7/24 474/138 |
| 5,730,561 A * | 3/1998 | Wambeke | .......... | B23D 57/0084 30/390 |
| 5,919,107 A | 7/1999 | Stepniak | | |
| 7,571,720 B2 * | 8/2009 | Donnerdal | ............. | B23D 47/12 30/388 |
| 7,611,431 B2 | 11/2009 | Dinca | | |
| 8,272,134 B2 * | 9/2012 | Soika | .................... | B23D 45/16 30/291 |
| 8,388,415 B2 * | 3/2013 | Soika | ............... | F02M 35/02491 451/178 |
| 8,668,027 B2 | 3/2014 | Hoffmann | | |
| 8,939,857 B2 * | 1/2015 | Doering | ................. | B24B 47/10 474/112 |
| 8,998,684 B2 * | 4/2015 | Rosani | .................. | B23D 47/12 451/347 |
| 9,221,111 B2 * | 12/2015 | Elfner | .................... | B23D 45/16 |
| 9,261,171 B2 * | 2/2016 | Doering | .................... | F16H 7/16 |
| 9,333,571 B2 * | 5/2016 | Donnerdal | ........... | B23D 45/003 |
| 10,723,011 B2 * | 7/2020 | Strömbäck | ............ | B23D 45/16 |
| 2007/0056575 A1 * | 3/2007 | Machens | ............... | B24B 41/007 173/162.1 |
| 2009/0013541 A1 * | 1/2009 | Amend | .................... | B28D 7/02 30/286 |
| 2009/0283286 A1 * | 11/2009 | Hoffmann | ............... | B24B 21/20 30/388 |
| 2014/0073467 A1 * | 3/2014 | Doering | .................... | F16H 7/16 474/112 |
| 2014/0230211 A1 * | 8/2014 | Doering | .................... | B27B 5/30 29/401.1 |
| 2018/0281086 A1 * | 10/2018 | Greitmann | .............. | B24B 27/08 |
| 2018/0369939 A1 * | 12/2018 | Zimmerman | ......... | B23D 61/02 |
| 2019/0070746 A1 * | 3/2019 | Hanussek | ................. | F16H 7/02 |

FOREIGN PATENT DOCUMENTS

| | | |
|---|---|---|
| DE | 202012103489 | 12/2013 |
| GB | 2459964 | 11/2009 |
| WO | 2007053168 | 5/2007 |
| WO | 2008146234 | 12/2008 |

* cited by examiner

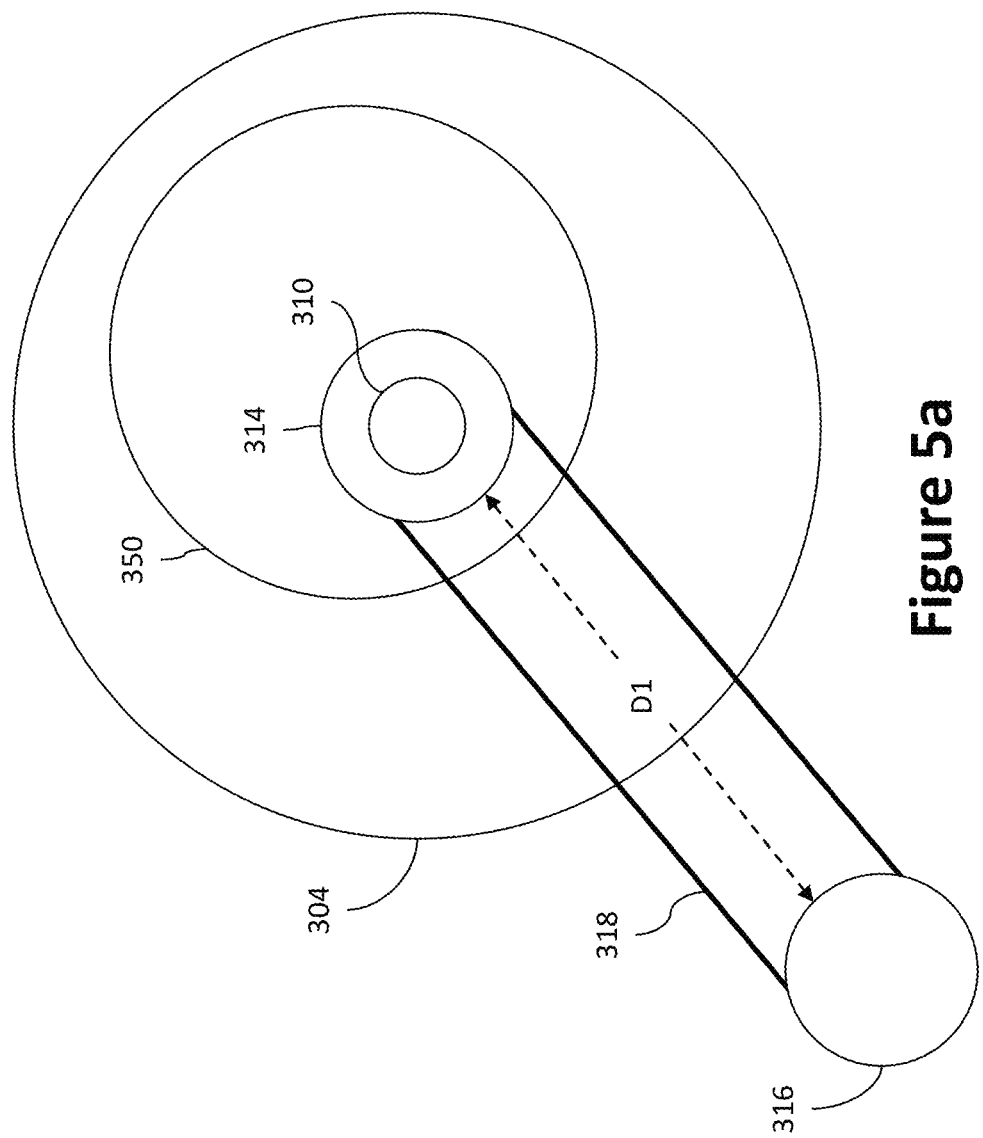

BELT TENSIONING APPARATUS FOR MATERIAL REMOVAL MACHINES

CROSS REFERENCE TO RELATED APPLICATIONS

This application claims priority from, and the benefit of, U.S. Provisional Application Ser. No. 62/724,145, entitled "BELT TENSIONING APPARATUS FOR MATERIAL REMOVAL MACHINES," filed Aug. 29, 2018, the entirety of which is hereby incorporated by reference.

TECHNICAL FIELD

The present disclosure generally relates to belt tensioning apparatus and, more particularly, to belt tensioning apparatus for material removal machines.

BACKGROUND

Conventional material removal machines, such as saws, grinders, and/or polishers, for example, use belt tensioner devices positioned along a length of a belt. The belt tensioner devices are conventionally configured to impinge upon a belt to adjust tension in the belt. However, these belt tensioner devices are imprecise and provide a limited range of potential belt tensions. Additionally, the belt tensioner devices may constitute obstructions when attaching and/or removing the belt due to the placement of the belt tensioner devices near the belt.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to belt tensioning apparatus for material removal machines, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

FIGS. 5*a*-5*c* show example movement the hub of FIG. 4, in relation to a spindle pulley and actuator pulley, in accordance with aspects of this disclosure.

Figure 1:
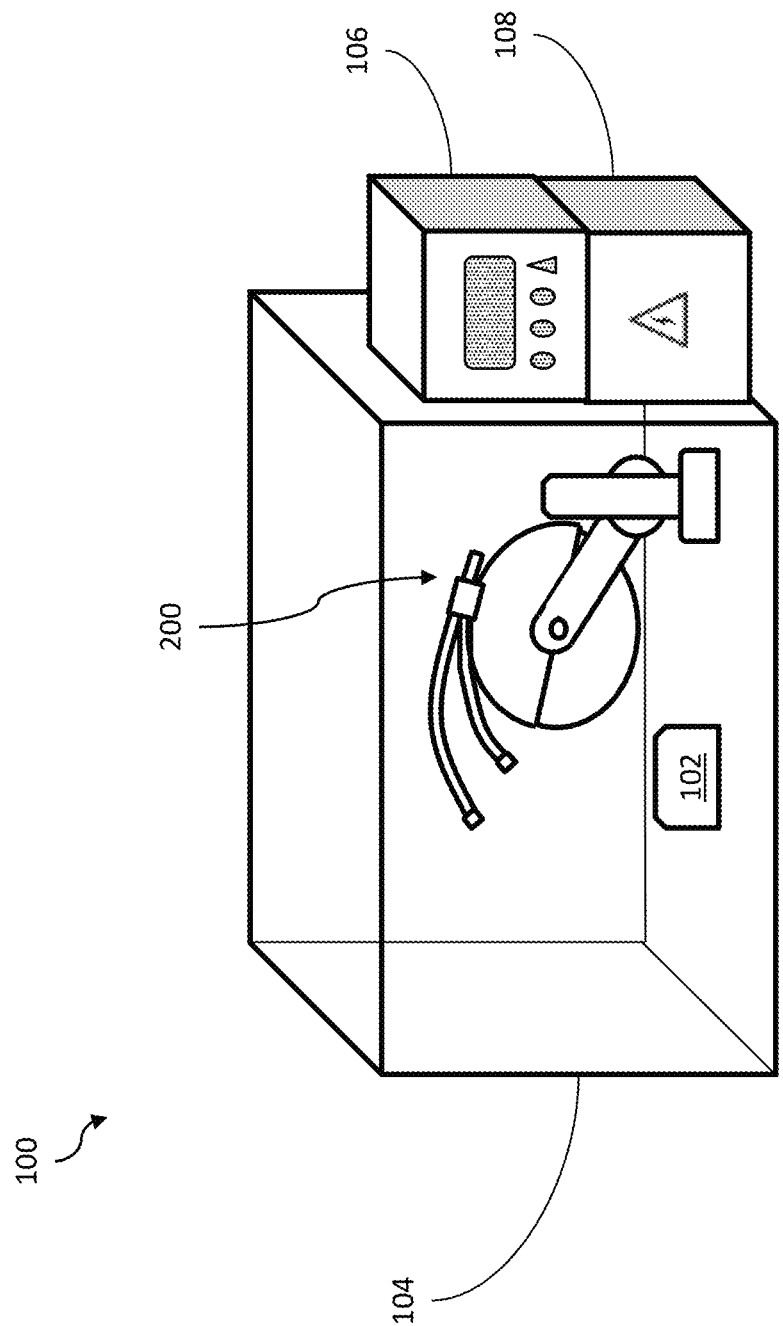
FIG. 1 is a perspective view of an example material removal system, in accordance with aspects of this disclosure.

The figures are not necessarily to scale. Where appropriate, the same or similar reference numerals are used in the figures to refer to similar or identical elements. For example, reference numerals utilizing lettering (e.g., upper support rail 202*a*, lower support rail 202*b*) refer to instances of the same reference numeral that does not have the lettering (e.g., support rails 202).

DETAILED DESCRIPTION

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z".

As utilized herein, the terms "e.g.," and "for example" set off lists of one or more non-limiting examples, instances, or illustrations.

Some examples of the present disclosure relate to a material removal apparatus, comprising a spindle configured to retain a material removal tool, a spindle pulley secured to the spindle, the spindle pulley configured to actuate the spindle, and a hub retaining the spindle, the hub configured to change a position of the spindle pulley.

In some examples, the apparatus further comprises an actuator pulley configured actuate the spindle pulley via a belt, the hub configured to change the position of the spindle pulley relative to the actuator pulley. In some examples, the hub is configured to move the spindle pulley from a first position at a first distance from an actuator pulley, to a second position at a second distance from the actuator pulley, the first distance being different from the second distance. In some examples, the belt has a first tension when the spindle pulley is at the first position, and a second tension when the spindle pulley is at the second position, the first tension being different from the second tension. In some examples, the apparatus further comprises an actuator configured to actuate the actuator pulley. In some examples, the hub is configured to change the position of the spindle pulley by changing the position of the spindle. In some examples, the hub is configured to engage a hub moving tool. In some examples, the apparatus further comprises a hub lock configured to prohibit movement of the hub when engaged, and allow movement of the hub when disengaged. In some examples, the hub lock is secured to a spindle housing that encircles at least a portion of the hub and the spindle. In some examples, the hub lock is configured to compress the spindle housing when engaged.

Some examples of the present disclosure relate to a method of adjusting belt tension in a material removal machine, comprising adjusting a position of a spindle pulley of the material removal machine via a hub of the material removal machine, wherein the spindle pulley is configured to actuate a material removal tool of the material removal machine.

In some examples, adjusting the position of the spindle pulley comprises adjusting the position of the spindle pulley with respect to an actuator pulley of the material removal machine. In some examples, adjusting the position of the spindle pulley comprises moving the spindle pulley from a first position at a first distance from an actuator pulley, to a second position at a second distance from the actuator pulley, the first distance being different from the second distance. In some examples, a belt connecting the spindle pulley to the actuator pulley has a first tension when the spindle pulley is at the first position, and a second tension when the spindle pulley is at the second position, the first tension being different from the second tension. In some examples, the method further comprises actuating the material removal tool via the spindle pulley. In some examples, actuating the material removal tool via the spindle pulley comprises translating actuation of the actuator pulley into actuation of the spindle pulley through the belt connecting the actuator pulley and the spindle pulley. In some examples, the method further comprises gaining access to a hub lock of the material removal machine and unlocking the hub via the hub lock before adjusting the position of the spindle pulley. In some examples, the method further comprises gaining access to a hub lock of the material removal machine and locking the hub via the hub lock after adjusting the position of the spindle pulley. In some examples, the spindle pulley is secured to a spindle of the material removal machine, the material removal tool is retained on the spindle, and the spindle is retained by the hub. In some examples, adjusting the position of a spindle pulley via the hub comprises adjusting the hub using a tool that engages with engagement features of the hub.

Some examples of the present disclosure relate to an improved belt tensioning apparatus for a material removal machine. In some examples, the material removal machine includes a material removal tool (e.g., a saw blade, an abrasive saw, a polisher, a grinder, and/or more general material preparation and/or testing tool). The material removal tool is mounted on a spindle that is actuated (e.g., turned, spun, etc.) by a spindle pulley, which is in turn actuated by an actuator pulley. A flexible belt stretches between (and/or connects) the spindle pulley and the actuator pulley. The belt has a belt tension that changes depending on the distance (e.g., how far) the belt is stretched between the spindle pulley and actuator pulley, with increased distance correlated with increased tension.

Some examples of the present disclosure use a movable hub instead of a conventional belt tensioner device to change tension in the belt. In some examples, the spindle is retained by the movable hub, such that movement of the hub translated into movement of the spindle. Because the spindle pulley is securely attached to the spindle, movement of the hub translates into movement of the spindle pulley. This movement of the spindle pulley changes a distance between the spindle pulley and the actuator pulley, thereby changing the tension in the belt connecting the spindle pulley and the actuator pulley. Thus, belt tension may be increased by moving the hub to a position where the spindle pulley is farther from the actuator pulley, and decreased by moving the hub to a position where the spindle pulley is closer to the actuator pulley. The hub may be locked in place once a desired position is reached.

In some examples, the movable hub makes it easier to attach and/or remove the belt from the pulleys. While efficient machine operation may require an increased tension in the belt, it may be easier to attach and/or remove the belt when there is a decreased tension in the belt. The movable hub allows for relatively easy adjustment of belt tension, which allows for easy transition between a belt tension ideal for attachment/removal and a belt tension ideal for machine operation. Additionally, the movable hub is not positioned along the length of the belt like a conventional belt tensioner, thereby removing an obstruction to attachment and/or removal of the belt. Further, the hub allows for more precise tensioning and/or a wider range of available belt tensions than a conventional belt tensioner device.

FIG. 1 shows a simplified illustration of an example material removal system 100. As shown, the material removal system 100 includes a material removal assembly 200 and a table 102 substantially enclosed within a cabinet 104 (and/or housing). The table 102 is configured to retain a material sample (not shown), upon which the material removal assembly 200 may operate. In the example of FIG. 1, the material removal assembly 200 further includes a user interface (UI) 106 and a power source 108.

Figure 2:
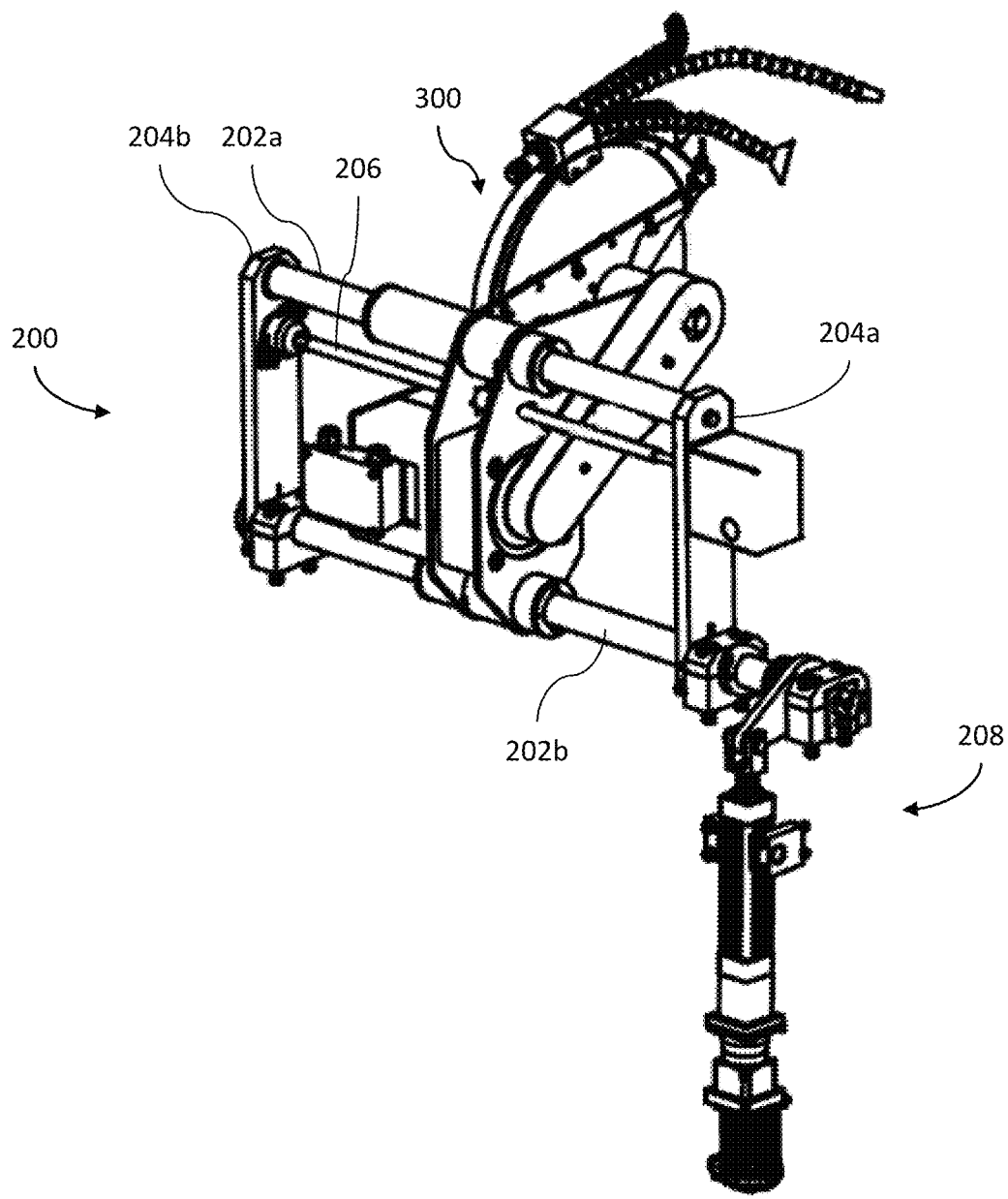
FIG. 2 is a rear perspective view of an example material removal assembly.

FIG. 2 shows a rear perspective view of an example material removal assembly 200. In the example of FIG. 2, the material removal assembly 200 includes a material removal machine 300. As shown, the material removal machine 300 is retained on an upper support rail 202a and a lower support rail 202b between a first end plate 204a and a second end plate 204b. The support rails 202 extend through the material removal machine 300 and are retained by the end plates 204. More particularly, the support rails 202 extend through sleeves 308 of the material removal machine 300 (see, e.g., FIG. 3a). An actuation shaft 206 also extends between the end plates 204 and through an actuation nut 308 of the material removal machine 300 (see, e.g., FIG. 3c). In some examples, rotation of the actuation shaft 206 in conjunction with engagement with the actuation nut 308 causes movement of the material removal machine 300. In some examples, an actuation unit 208 may further rotate the lower support rail 202b, and thereby cause rotational movement of the end plates 204 and material removal machine 300.

Figure 3A:
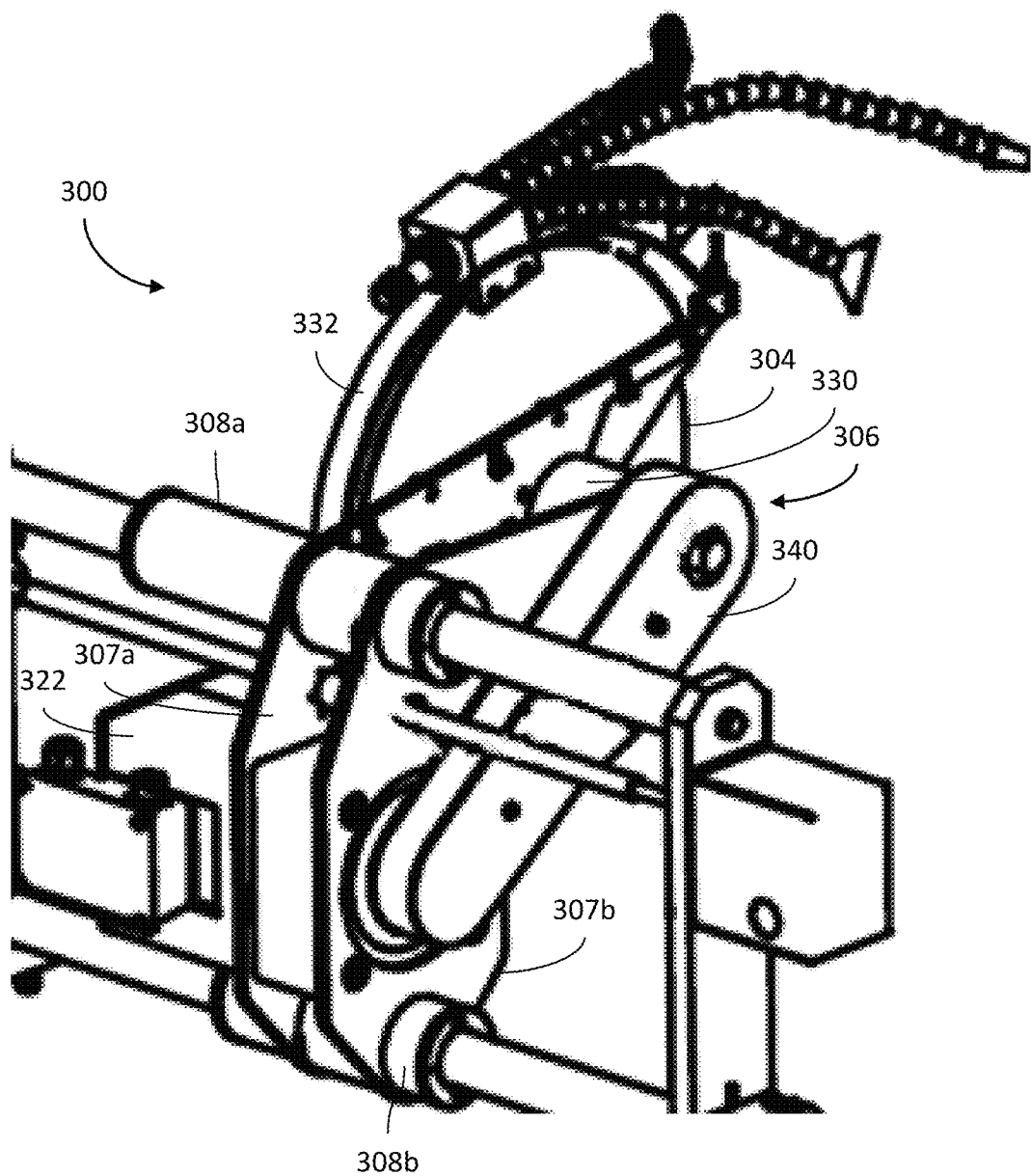
FIG. 3*a* is an enlarged rear perspective view of an example material removal machine of the material removal assembly of FIG. 2, in accordance with aspects of this disclosure
Figure 3B:
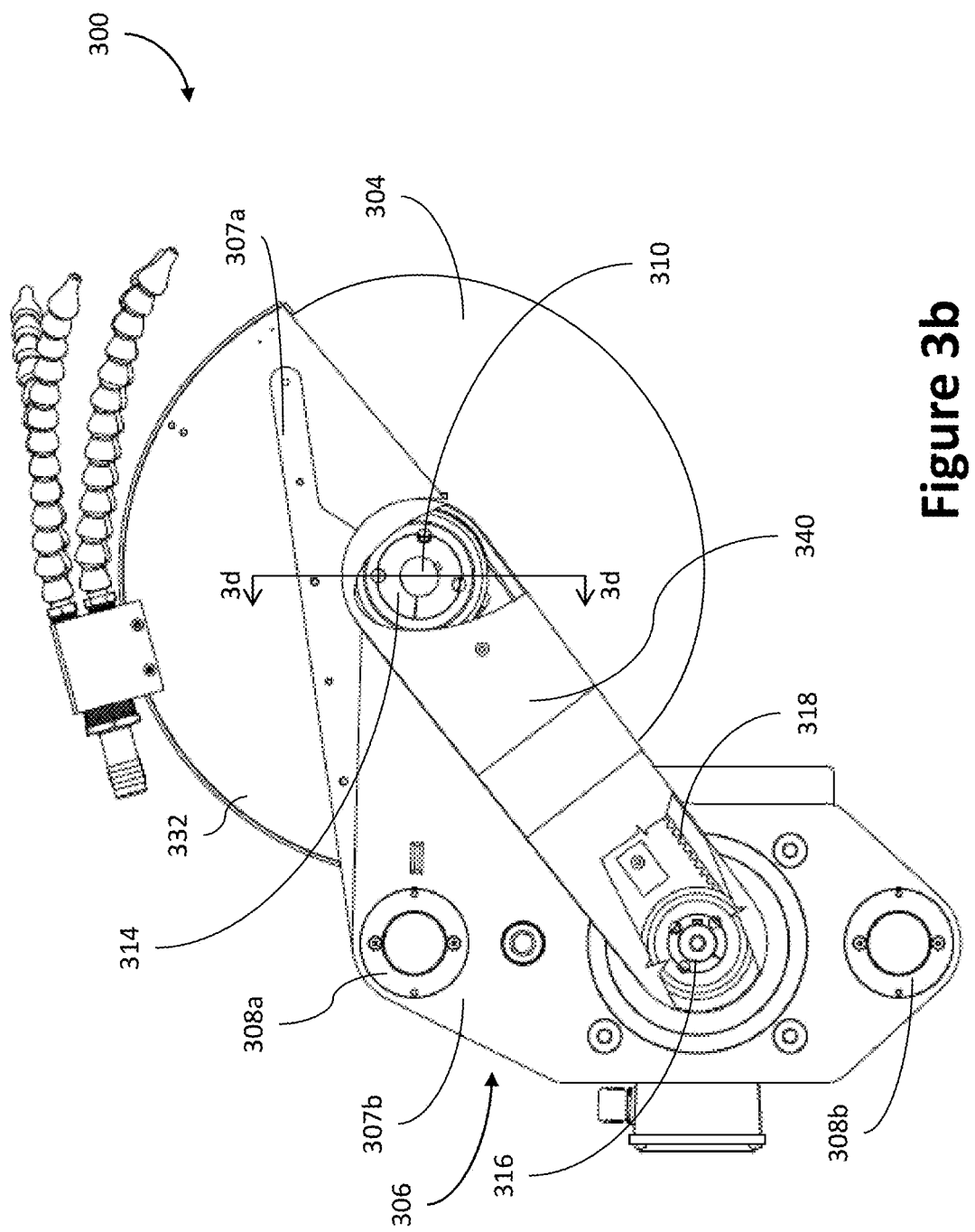
FIG. 3*b* is a side view of an example material removal machine of the material removal assembly of FIG. 1, with some portions cut away for clarity, in accordance with aspects of this disclosure.
Figure 3C:
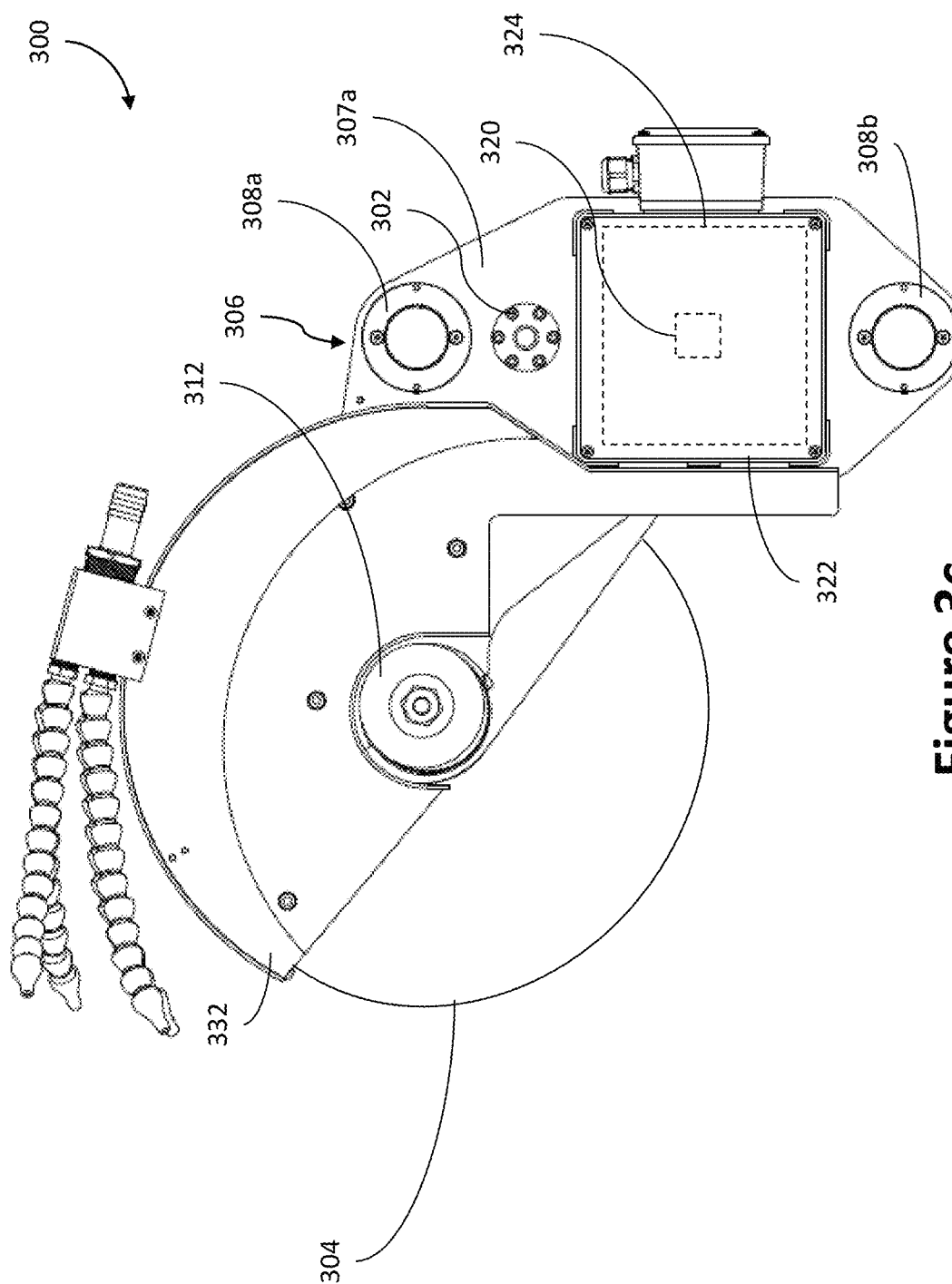
FIG. 3*c* is an opposite side view of the example material removal machine of FIG. 3*b*, in accordance with aspects of this disclosure.

FIGS. 3a-3d show various views of the material removal machine 300. FIG. 3a is an enlarged rear perspective view, while FIGS. 3b and 3c are side views of the material removal machine 300, with some of the other elements of the material removal assembly 200 removed for the sake of clarity. As shown, the material removal machine 300 includes a material removal tool 304 (e.g., a saw blade, abrasive saw, grinder, polisher, etc.) retained on a spindle 310 that is at least partially encased in a spindle housing 330 of the support 306. In the example of FIGS. 3a-3d, the material removal tool 304 is a disc.

In the example of FIG. 3a, the support 306 comprises two substantially parallel support plates 307: a first support plate 307a and a second support plate 307b. The support plate 307a includes the nut 302. A shield 332 connected to the support plate 307a partially encloses (and/or encases) the material removal tool 300. The support plates 307 are connected through the sleeves 308 (upper sleeve 308a and lower sleeve 308b), the spindle housing 330, and a tool actuator housing 322. The tool actuator housing 322 encloses a tool actuator 320 and/or tool actuator controller 324. In some examples, the tool actuator 320 and/or tool actuator controller 324 may be powered by the power source 108, or may be powered by a separate power source retained within the tool actuator housing 322.

In the example of FIGS. 3b and 3c, the tool actuator 320 is in mechanical communication with an actuator pulley 316. The tool actuator 320 (e.g., an electrical motor) is configured to actuate (e.g., move, turn, spin, rotate, etc.) the actuator pulley 316, such as in response to one or more signals from the actuator controller 324. As shown, the actuator pulley 316 is mechanically connected to a spindle pulley 314 via a belt 318. As shown, the actuator pulley 316, spindle pulley 314, and belt 318 are substantially encased within an arm 340 of the support 307. The belt 318 translates actuation (e.g., movement, rotation, turning, spinning, etc.) of the actuator pulley 316 into actuation (e.g., movement, rotation, turning, spinning, etc.) of the spindle pulley 314. The spindle pulley 314 is secured to the spindle 310, such that actuation (e.g., movement, rotation, turning, spinning, etc.) of the actuator pulley 316 by the tool actuator 320 translates into actuation (e.g., movement, rotation, turning, spinning, etc.) of the spindle 310 and/or material removal tool 304 via the spindle pulley 314.

Figure 3D:
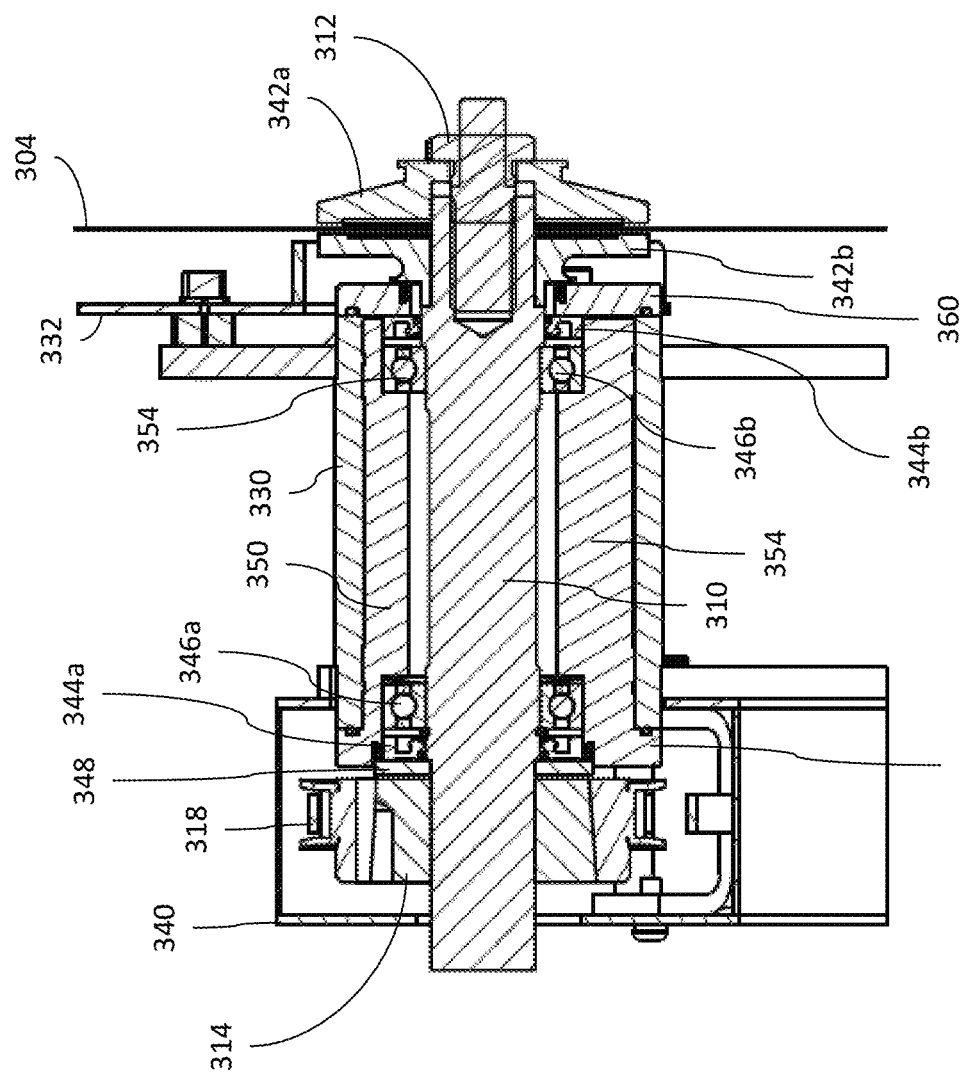
FIG. 3*d* is a cross-section along line 3*d*-3*d* in FIG. 3*b*, in accordance with aspects of this disclosure.
Figure 4:
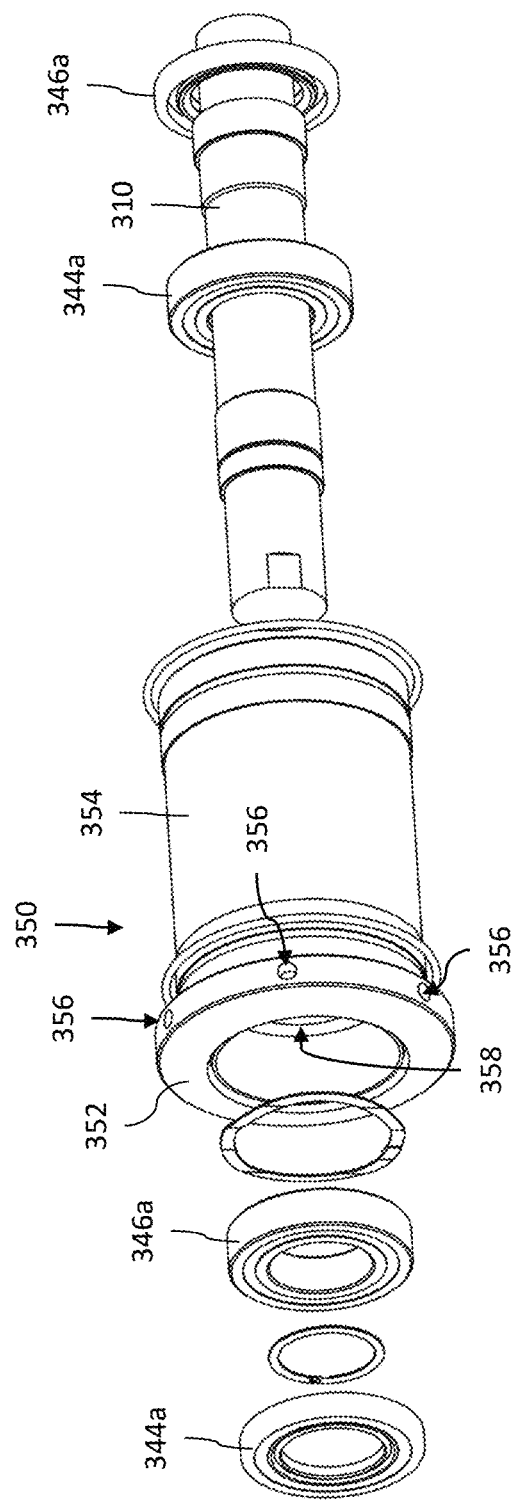
FIG. 4 shows an exploded view of a hub and spindle assembly, in accordance with aspects of this disclosure.

In the example of FIG. 3d, the spindle 310 extends through an approximate center (and/or central aperture) of the material removal tool 304 and the spindle pulley 314. A fastener 312 attaches to an end of the spindle 310 and secures the material removal tool 304 on the spindle 310 between flanges 342. As shown, the fastener 312 is a nut, but in other examples the fastener 312 may be a nut, bolt, screw, nail, and/or any other type of appropriate fastener.

In the example of FIG. 3d, the spindle 310 is retained by the hub 350. In the examples of FIGS. 3d and 3e, the hub 350 is substantially cylindrical, and includes a collar 352 at an end of the hub 350, with a body 354 extending from the collar 352. As shown, the collar 352 has a larger outer diameter than the body 354. The collar 352 also includes pin holes 356 around the circumference of the collar 352. The pin holes 356 are configured to engage pins of a pin wrench, allowing the pin wrench to grip and/or move (e.g., turn, rotate, spin, etc.) the collar 352 when the collar is unlocked.

In the example of FIG. 3d, plate seals 344 and ball bearings 346 are pinched between the hub 350 and the spindle 310 to help keep the spindle 310 in place, while still allowing the spindle 310 to move (e.g., spin, rotate, turn, etc.) within the hub 350. The plate seals 344 additionally serve as seals, to keep lubricant within the hub 350, and debris out of the hub 350. As shown, an additional seal 348 attaches to the collar 352 of the hub 350 and/or plate seal 344a. In the example of FIG. 3d, the body 354 of the hub 350 is retained within the spindle housing 330, such that an outer diameter of the body 354 is less than the inner diameter of the spindle housing 330. As shown, the collar 352 is not retained within the spindle housing 330, but is rather substantially aligned (and/or collinear) with the spindle housing 330, such that the collar 352 has an outer diameter approximately equal to the spindle housing 330.

In the examples of FIGS. 3d and 3e, the hub 350 includes a cylindrical bore 358 that extends through the hub 350 off center (e.g., shifted from a central axis of the hub 350), such that the hub 350 has an eccentric arrangement. The spindle 310 is secured within an approximate center of the bore 358.

Figure 5B:
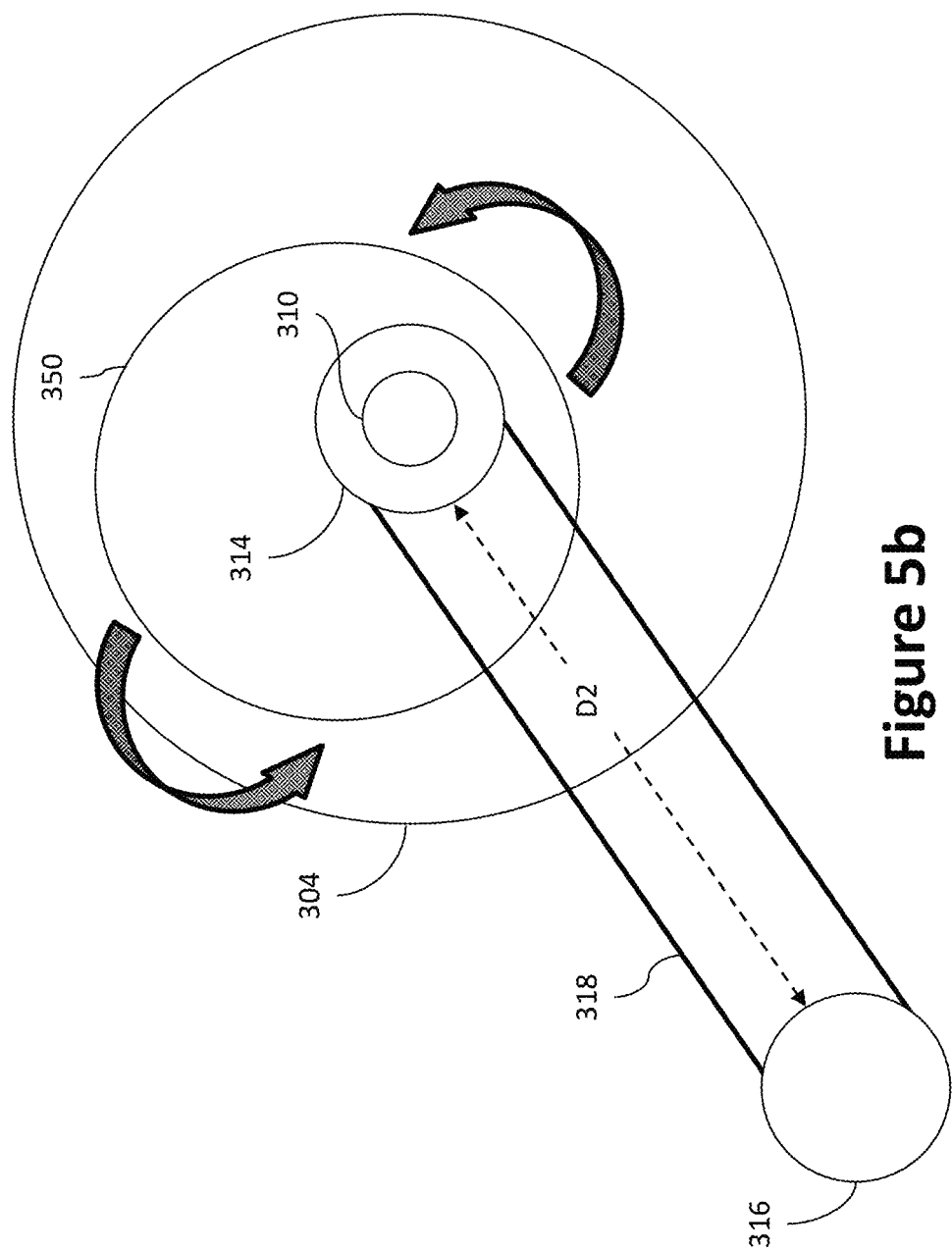
Figure 5C:
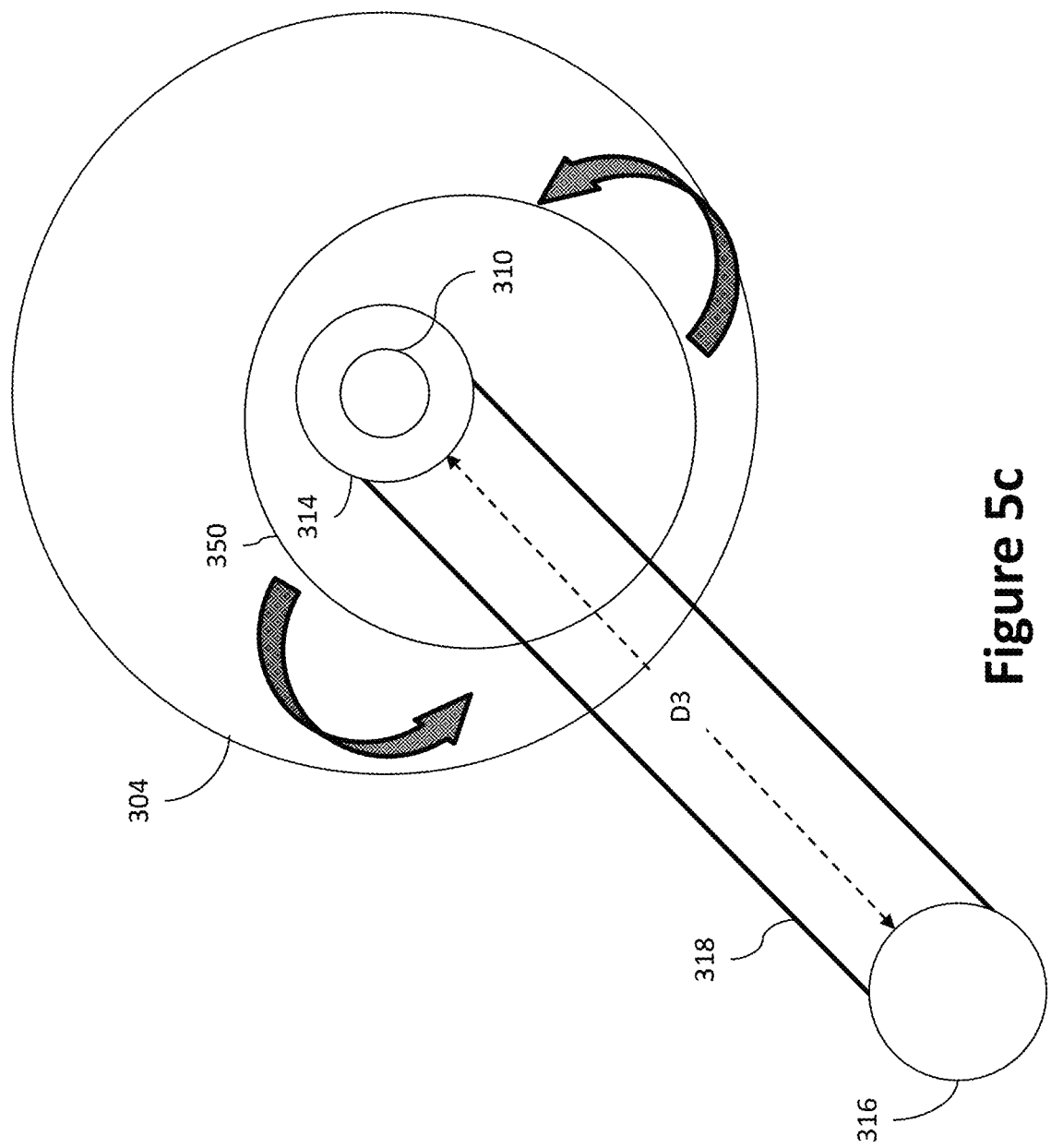

This organization results in the spindle 310 and spindle pulley 314 being retained by the hub 350 at a shifted, off-center, and/or eccentric position with respect to the hub 350, such as shown in the examples of FIGS. 5a-5c. Thus, when the hub 350 is rotated (and/or turned, spun, moved, etc.), the spindle 310 and/or spindle pulley 314 are moved to different positions, rather than simply being spun (and/or rotated, turned, etc.) in place. In the example of FIG. 3d, the spindle pulley 314 is advantageously positioned within the arm 340 with enough space so that this movement is possible. As the actuator pulley 316 is substantially fixed with respect to other components of the material removal machine 300 (e.g., the spindle pulley 314, hub 350, etc.), movement of the spindle pulley 314 results in a change in distance between the spindle pulley 314 and the actuator pulley 316. This change in distance in turn results in a change in tension of the belt 318 connecting the spindle pulley 314 and the actuator pulley 316.

FIGS. 5a-5c, shows an exaggerated example of movement of the hub 350 when the hub 350 is unlocked and, through the hub 350, movement of the spindle pulley 314, spindle 310, and/or material removal machine 300. The difference in dimensions of the hub 350 and spindle pulley 314 are exaggerated in FIGS. 5a-5c, to make the operation clearer. In FIG. 5a, the spindle pulley 314 is at a first position a first distance D1 from the actuator pulley 316. This results in a first tension in the belt 318. In the example of FIG. 5b, the spindle pulley 314 has been moved to a second position a second distance D2 from the actuator pulley 316. This results in a second tension in the belt 318. As the first distance D1 is less than the second distance D2, the first tension will be less than the second tension. Thus, the first position of FIG. 5a may be better for attaching and/or removing the belt, while the second position of FIG. 5b may be better for operation of the material removal machine 300 (and/or material removal tool 304). FIG. 5c shows the spindle pulley 314 at a third position a third distance D1 from the actuator pulley 316. This results in a third tension in the belt 318. As the first distance D1 is less than the third distance D3, the first tension will be less than the third tension. The second distance D2 is also less than the third distance D3, so the second tension will be less than the third tension. Thus, the first or second positions of FIGS. 5a and 5b may be better for attaching and/or removing the belt, while the third position of FIG. 5c may be better for operation of the material removal machine 300 (and/or material removal tool 304).

In the example of FIG. 3d, a hub plate 360 attaches to the spindle housing 330 proximate to the material removal tool 304, such that the flange 342b abuts the hub plate 360. The hub plate 360 is configured to compress the spindle housing 330 when the hub plate 360 is tightened onto the spindle housing 330, so as to lock the hub 350 in place. More particularly, when the hub plate 360 compresses the spindle housing 330, the spindle housing 330 squeezes tightly against the hub 350, preventing movement (e.g., rotation, turning, spinning, etc.) of the hub 350. When the hub plate 360 is loosened, the spindle housing 330 is allowed to expand somewhat, giving the hub plate 360 room to move (e.g., spin, turn, rotate, etc.) within the spindle housing 330. In some examples, hub plate fasteners (not shown) may be used to loosen and/or tighten the hub plate 360. Thus, the hub plate 360 provides a mechanism through which the hub 350 may be locked and/or unlocked.

In operation, an operator may initially attach the belt 318 to the material removal machine 300. In order to minimize the human effort necessary to stretch the belt, the operator may wish to move the hub 350 so that the spindle pulley 314 is closer to the actuator pulley 316. Thus, the operator may unlock the hub 350 by loosening the hub plate 360. In order to get to the hub plate 360 for loosening, the fastener 312, material removal tool 304, and/or flanges 342 may need to be removed from the spindle 310. While the removal of these components to access the hub plate 360 may be slightly inconvenient, the obstructed access may help prevent accidental loosening of the hub plate 360. Once the hub plate 360 is loosened, the operator may adjust the hub 350, such as via a pin wrench for example. For example, the operator may adjust the hub 350 to position similar to the first position illustrated in FIG. 5a. The operator may then attach the belt 318 to the spindle pulley 314 and/or actuator pulley 316, stretching the belt 318 as necessary. Once the belt 318 is attached, the operator may move the hub 350 to a position where the belt 318 will have a higher tension, which may be better for operation of the material removal machine 300 (and/or material removal tool 304). For example, the operator may adjust the hub 350 to position similar to the second or third position illustrated in FIGS. 5b and 5c. Once the hub 350 has been appropriately positioned, with the belt attached, the operator may tighten the hub plate 360 so as to lock the hub 350 in place, then reattach the flanges 342, material removal tool 304, and/or fastener 312. Finally, the material removal machine 300 may be ready for operation through actuation of the material removal tool 304 via the tool actuator 320, actuator pulley 316, belt 318, spindle pulley 314, and/or spindle 310.

While the present apparatus, systems, and/or methods have been described with reference to certain implementations, it will be understood by those skilled in the art that various changes may be made and equivalents may be substituted without departing from the scope of the present apparatus, systems, and/or methods. In addition, many modifications may be made to adapt a particular situation or material to the teachings of the present disclosure without departing from its scope. Therefore, it is intended that the present apparatus, systems, and/or methods not be limited to the particular implementations disclosed, but that the present apparatus, systems, and/or methods will include all implementations falling within the scope of the appended claims.

What is claimed is:

1. A material removal apparatus, comprising:
   a spindle configured to retain a material removal tool;
   a spindle pulley secured to the spindle, the spindle pulley configured to actuate the spindle; and
   a hub retaining the spindle, the hub configured to change a pulley position of the spindle pulley, wherein the hub is configured to change a spindle position of the spindle when changing the pulley position of the spindle pulley.

2. The apparatus of claim 1, wherein the hub comprises a cylindrical body positioned between the spindle pulley and the material removal tool.

3. The apparatus of claim 1, further comprising an actuator pulley configured to actuate the spindle pulley via a belt, wherein the hub is configured to move the spindle pulley from a first pulley position at a first distance from the actuator pulley, to a second pulley position at a second distance from the actuator pulley, the first distance being different from the second distance, wherein the belt has a first tension when the spindle pulley is at the first pulley position, and a second tension when the spindle pulley is at the second pulley position, the first tension being different from the second tension.

4. The apparatus of claim 3, further comprising a support arm that houses the spindle pulley and actuator pulley, wherein a first portion of the hub is positioned within the support arm and a second portion of the hub is not positioned within the support arm.

5. The apparatus of claim 1, wherein the hub encircles both the spindle and a ball bearing assembly that is configured to allow the spindle to rotate within the hub.

6. The apparatus of claim 1, wherein the hub is further configured to change a tool position of the material removal tool when changing the spindle position of the spindle or the pulley position of the spindle pulley.

7. The apparatus of claim 1, wherein the hub comprises one or more features configured to engage a hub moving tool.

8. A material removal apparatus comprising:
   a spindle configured to retain a material removal tool;
   a spindle pulley secured to the spindle, the spindle pulley configured to actuate the spindle;
   a hub retaining the spindle, the hub configured to change a position of the spindle pulley; and
   a hub lock configured to prohibit movement of the hub when engaged, and allow movement of the hub when disengaged, wherein the hub lock is secured to a spindle housing that encircles at least a portion of the hub and the spindle, and the hub lock is configured to compress the spindle housing when engaged.

9. The apparatus of claim 8, wherein the spindle housing is configured to squeeze tightly against the hub when compressed, thereby resisting movement of the hub.

10. The apparatus of claim 9, wherein at least the portion of the hub has an outer diameter that is less than an inner diameter of the spindle housing.

11. A method of adjusting belt tension in a material removal machine, comprising:
   adjusting a pulley position of a spindle pulley of the material removal machine via a hub of the material removal machine, the spindle pulley being configured to actuate a spindle of the material removal machine, a material removal tool of the material removal machine being mounted on the spindle, and a spindle position of the spindle being adjusted when the pulley position of the spindle pulley is adjusted.

12. The method of claim 11, wherein the hub comprises a cylindrical body.

13. The method of claim 11, wherein adjusting the pulley position of the spindle pulley comprises moving the spindle pulley from a first pulley position at a first distance from an actuator pulley, to a second pulley position at a second distance from the actuator pulley, the first distance being different from the second distance, wherein a belt connecting the spindle pulley to the actuator pulley has a first tension when the spindle pulley is at the first pulley position, and a second tension when the spindle pulley is at the second pulley position, the first tension being different from the second tension.

14. The method of claim 13, wherein the spindle pulley and the actuator pulley are housed within a support arm, a first portion of the hub being positioned within the support arm and a second portion of the hub being positioned outside the support arm.

15. The method of claim 13, the method further comprising:
   gaining access to a hub lock of the material removal machine and locking the hub via the hub lock after adjusting the pulley position of the spindle pulley to be at the second pulley position;
   gaining access to the hub lock and unlocking the hub via the hub lock;

adjusting the pulley position of the spindle pulley to be at a third pulley position at a third distance from the actuator pulley, the third distance being different than the first distance and second distance; and locking the hub via the hub lock while the spindle pulley is at the third pulley position.

16. The method of claim 13, further comprising:

actuating the spindle, and the material removal tool mounted on the spindle, via the spindle pulley, when the spindle pulley is at the second pulley position;

adjusting the pulley position of the spindle pulley to be at a third pulley position at a third distance from the actuator pulley, the third distance being different than the first distance and second distance; and actuating the spindle, and the material removal tool mounted on the spindle, via the spindle pulley, when the spindle pulley is at the third pulley position.

17. The method of claim 13, wherein adjusting the pulley position of the spindle pulley via the hub comprises moving the spindle pulley from the first pulley position to the second pulley position while the spindle pulley, actuator pulley, and belt are encased within a support arm.

18. The method of claim 11, wherein the hub is positioned between the spindle pulley and the material removal tool.

19. The method of claim 11, wherein adjusting the pulley position of the spindle pulley via a hub comprises adjusting a tool position of the material removal tool.

20. The method of claim 11, wherein the hub encircles both the spindle and a ball bearing assembly that is configured to allow the spindle to rotate within the hub.

* * * * *